United States Patent
Noh et al.

(10) Patent No.: US 8,792,411 B2
(45) Date of Patent: Jul. 29, 2014

(54) METHOD AND APPARATUS FOR TRANSMITTING CONTROL SIGNAL OF RELAY STATION IN WIRELESS COMMUNICATION SYSTEM

(75) Inventors: Min Seok Noh, Anyang-si (KR); Sung Ho Moon, Anyang-si (KR); Kyu Jin Park, Anyang-si (KR); Jae Hoon Chung, Anyang-si (KR)

(73) Assignee: LG Electronics Inc., Seoul (KP)

( * ) Notice: Subject to any disclaimer, the term of this patent is extended or adjusted under 35 U.S.C. 154(b) by 83 days.

(21) Appl. No.: 13/387,391

(22) PCT Filed: Jul. 29, 2010

(86) PCT No.: PCT/KR2010/004983
§ 371 (c)(1),
(2), (4) Date: Jan. 27, 2012

(87) PCT Pub. No.: WO2011/014019
PCT Pub. Date: Feb. 3, 2011

(65) Prior Publication Data
US 2012/0140698 A1    Jun. 7, 2012

Related U.S. Application Data

(60) Provisional application No. 61/229,716, filed on Jul. 29, 2009.

(51) Int. Cl.
*H04B 7/14* (2006.01)
*H04W 4/00* (2009.01)

(52) U.S. Cl.
USPC .......................................... 370/315; 370/329

(58) Field of Classification Search
USPC ................................. 370/315, 329
See application file for complete search history.

(56) References Cited

U.S. PATENT DOCUMENTS

| | | | |
|---|---|---|---|
| 8,077,693 B2* | 12/2011 | Zhang et al. | 370/345 |
| 2008/0076406 A1 | 3/2008 | Chen et al. | |
| 2008/0165719 A1 | 7/2008 | Visotsky | |
| 2008/0248793 A1* | 10/2008 | Chang et al. | 455/422.1 |
| 2009/0029645 A1 | 1/2009 | Leroudier | |
| 2009/0232065 A1* | 9/2009 | Zhang et al. | 370/329 |
| 2011/0228722 A1* | 9/2011 | Noh et al. | 370/315 |

FOREIGN PATENT DOCUMENTS

WO    WO 2008/115588 A2    9/2008

OTHER PUBLICATIONS

3GPP TSG-RSN WG1, Feb. 11-15,2008, Meeting #52, pp. 1-28.*
RAN1#50, Aug. 2007,Athens Greece, pp. 1-4.*

* cited by examiner

*Primary Examiner* — Mark Rinehart
*Assistant Examiner* — Angel Brockman
(74) *Attorney, Agent, or Firm* — Birch, Stewart, Kolasch & Birch, LLP

(57) ABSTRACT

A method and an apparatus for transmitting a control signal of a relay station in a wireless communication system are provided. The relay station generates a control signal of uplink control information and performs mapping of the generated modulation symbol into a backhaul subframe that has a relay physical uplink control channel (R-PUCCH) assigned thereto. The backhaul subframe includes two slots among. Among single carrier frequency division multiple access (SC-FDMA) symbols that constitute the backhaul subframe, an orthogonal cover (OC) sequence is applied to the SC-FDMA symbol which the modulation symbol has been mapped into, and later the backhaul subframe is transmitted. The generated modulation symbol is mapped according to the same pattern as the two slots.

13 Claims, 23 Drawing Sheets

FIG. 13
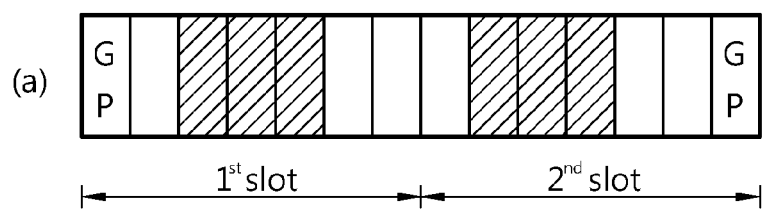
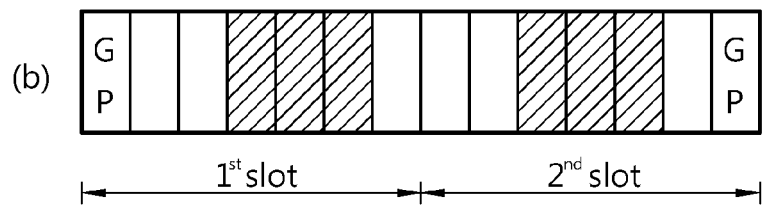
▨ :DM RS
☐ :ACK/NACK information

FIG. 15
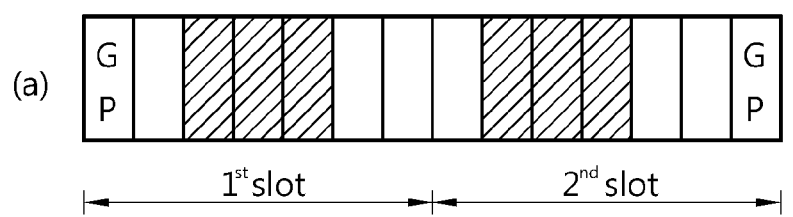
(a)
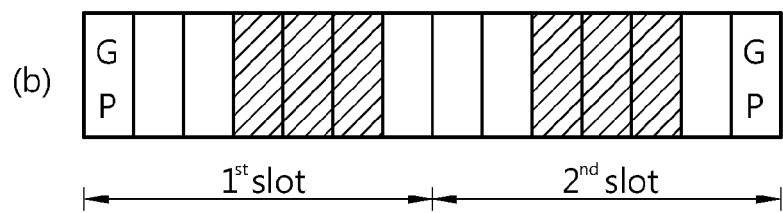
(b)
▨ :Length-3 OC Sequence 1
☐ :Length-3 OC Sequence 2

FIG. 16
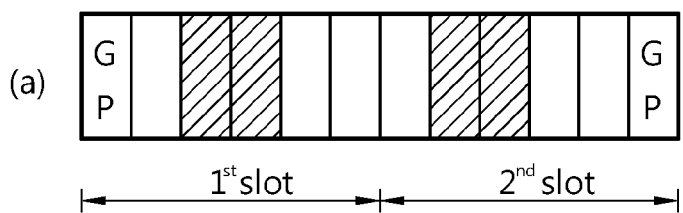
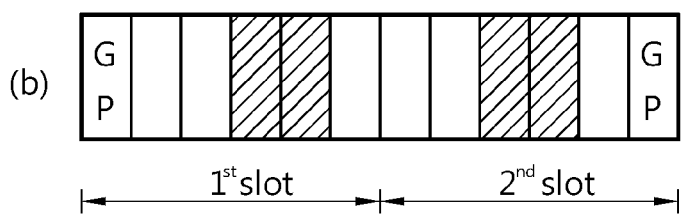
▨ :Length-2 OC Sequence 1
☐ :Length-3 OC Sequence 2

METHOD AND APPARATUS FOR TRANSMITTING CONTROL SIGNAL OF RELAY STATION IN WIRELESS COMMUNICATION SYSTEM

CROSS REFERENCE TO RELATED APPLICATIONS

This application is the National Phase of PCT/KR2010/004983 filed on Jul. 29, 2010, which claims priority under 35 U.S.C. 119 (e) to U.S. Provisional Application No. 61/229,716 filed on Jul. 29, 2009, all of which are hereby incorporated by reference into the present application.

BACKGROUND OF THE INVENTION

1. Field of the Invention

The present invention relates to wireless communications, and more particularly, to a method and apparatus for transmitting a control signal of a relay station in a wireless communication system.

2. Related Art

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

A user equipment (UE) can transmit an uplink control signal through a physical uplink control channel (PUCCH) assigned by a base station (BS). The uplink control signal may include a hybrid automatic repeat request (HARQ) acknowledgement (ACK)/non-acknowledgement (NACK), a channel quality indicator (CQI) indicating a downlink channel state, a scheduling request (SR) as a request for uplink radio resource assignment, etc.

A wireless communication system employing a relay station (RS) has recently been developed. The RS is employed for cell coverage extension and transmission capability improvement. A BS provides a service to a UE located in a coverage boundary of the BS via the RS, and thus can obtain an effect of extending the cell coverage. In addition, the RS improves signal transmission reliability between the BS and the UE, thereby improving transmission capacity. The RS can be used when the UE is located in a shadow area even if the UE is located within the coverage of the BS.

Similarly to the UE, the RS can also transmit the uplink control signal. The uplink control signal of the RS can be transmitted through a relay R(relay)-PUCCH assigned by using the BS. The R-PUCCH is a channel assigned to transmit the uplink control signal by the RS through a backhaul uplink The uplink control signal of the RS can also include an HARQ ACK/NACK, a CQI, an SR, etc.

Accordingly, there is a need for a method of effectively transmitting a control signal of an RS.

SUMMARY OF THE INVENTION

The present invention provides a method and apparatus for transmitting a control signal of a relay station in a wireless communication system.

In an aspect, a method for transmitting a control signal of a relay station in a wireless communication system is provided. The method includes generating a modulation symbol of uplink control information, mapping the generated modulation symbol to a backhaul subframe to which a relay physical uplink control channel (R-PUCCH) is assigned, applying an orthogonal cover (OC) sequence to a single carrier frequency division multiple access (SC-FDMA) symbol to which the modulation symbol is mapped among SC-FDMA symbols constituting the backhaul subframe, and transmitting the backhaul subframe, wherein the backhaul subframe includes two slots, and wherein the generated modulation symbol is mapped to the two slots according to the same pattern. First and last SC-FDMA symbols of the backhaul subframe may be assigned as a guard time. A first half SC-FDMA symbol and a last half SC-FDMA symbol of the backhaul frame may be assigned as a guard time. A sounding reference signal (SRS) may be mapped to the backhaul subframe. The SRS may be mapped to a last SC-FDMA symbol of a first slot of the backhaul subframe or a last SC-FDMA symbol of a second slot of the backhaul subframe. A length of the OC sequence may be determined according to a number of SC-FDMA symbols to which the modulation symbol is mapped in one slot. The OC sequence may be either a discrete Fourier transform (DFT) sequence or a Hadamard sequence. The uplink control information may include at least one of an acknowledgement/non-acknowledgement (ACK/NACK), a channel quality indicator (CQI), and a scheduling request (SR). A pattern by which the modulation symbol is mapped to the backhaul subframe may be determined according to a type of the uplink control information. The R-PUCCH may be assigned by a higher layer message transmitted by a base station.

In another aspect, an apparatus for transmitting a control signal in a wireless communication system is provided. The apparatus includes a processor, and a radio frequency (RF)

unit, coupled to the processor, for transmitting a backhaul subframe, wherein the processor is configured for generating a modulation symbol of uplink control information, mapping the generated modulation symbol to a backhaul subframe to which a relay physical uplink control channel (R-PUCCH) is assigned, and applying an orthogonal cover (OC) sequence to a single carrier frequency division multiple access (SC-FDMA) symbol to which the modulation symbol is mapped among SC-FDMA symbols constituting the backhaul subframe, and wherein the backhaul subframe includes two slots and the generated modulation symbol is mapped to the two slots according to the two slots. The uplink control information may include at least one of an acknowledgement/non-acknowledgement (ACK/NACK), a channel quality indicator (CQI), and a scheduling request (SR). A pattern by which the modulation symbol is mapped to the backhaul subframe may be determined according to a type of the uplink control information. First and last SC-FDMA symbols of the backhaul subframe or a first half SC-FDMA symbol and a last half SC-FDMA symbol of the backhaul frame may be assigned as a guard time. A length of the OC sequence may be determined according to a number of SC-FDMA symbols to which the modulation symbol is mapped in one slot.

According to the present invention, since a relay physical uplink control channel (R-PUCCH) is configured in the same structure in two slots in a subframe by considering a guard time of a backhaul link, an uplink control signal can be effectively transmitted.

BRIEF DESCRIPTION OF THE DRAWINGS

FIGS. 13 to 16 show an example of an R-PUCCH structure according to the proposed control signal transmission method of an RS.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LTE-A will be largely described, but the technical concept of the present invention is not meant to be limited thereto.

Figure 1:
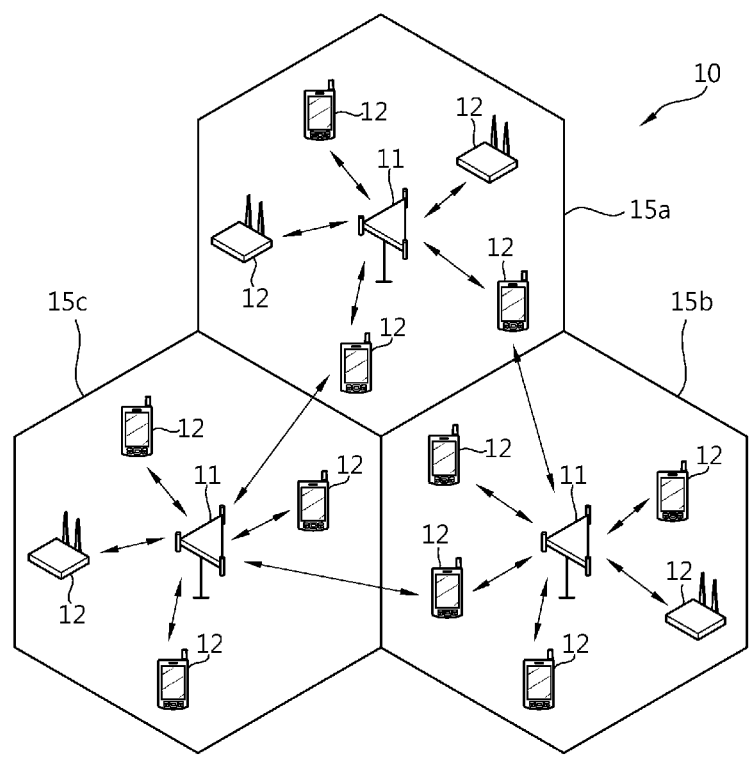
FIG. 1 shows a wireless communication system.

FIG. 1 shows a wireless communication system.

The wireless communication system 10 includes at least one base station (BS) 11.

Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

Figure 2:
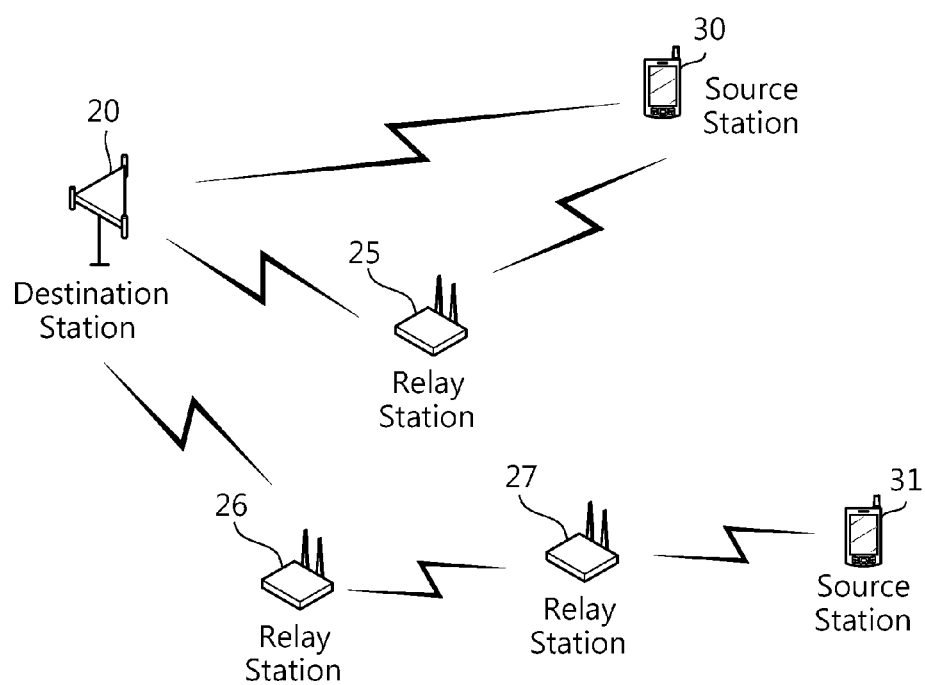
FIG. 2 shows an example of a wireless communication system using a relay station (RS).

FIG. 2 shows an example of a wireless communication system using a relay station (RS).

In uplink (UL) transmission, a source station may be a UE, and a destination stations may be a BS. In downlink (DL) transmission, a source stations may be the BS, and a destination stations may be the UE. The RS may be the UE, or may be provided as a separate RS. The BS may perform functions such as connectivity, management, control, and resource assignment between the RS and the UE.

Referring to FIG. 2, a destination station 20 communicates with a source station 30 via an RS 25. In UL transmission, the source station 30 transmits UL data to the destination station 20 and the RS 25, and the RS 20 retransmits the received data. The destination station 20 also communicates with a source station 31 via RSs 26 and 27. In UL transmission, the source station 31 transmits UL data to the destination station 20 and the RSs 26 and 27, and the RSs 26 and 27 retransmit the received data simultaneously or in sequence.

Although one destination station 20, three RSs 25, 26, and 27, and two source stations 30 and 41 are shown herein, the present invention is not limited thereto. The number of destination stations, RSs, and source stations included in the wireless communication system is not limited to any particular number.

A relay scheme used in the RS may be either amplify and forward (AF) or decode and forward (DF), and the technical features of the present invention are not limited thereto.

Figure 3:
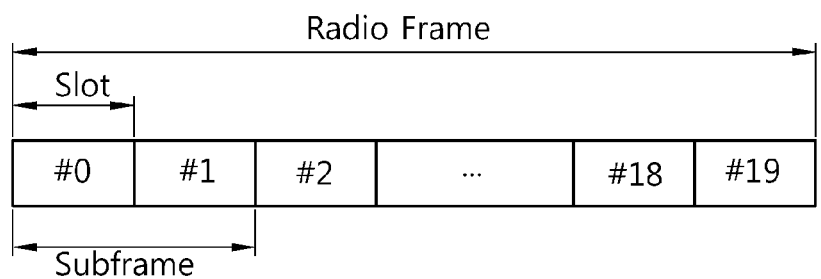
FIG. 3 shows the structure of a radio frame in 3GPP LTE.

FIG. 3 shows the structure of a radio frame in 3GPP LTE. It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 3, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of orthogonal frequency division multiplexing (OFDM) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 4:
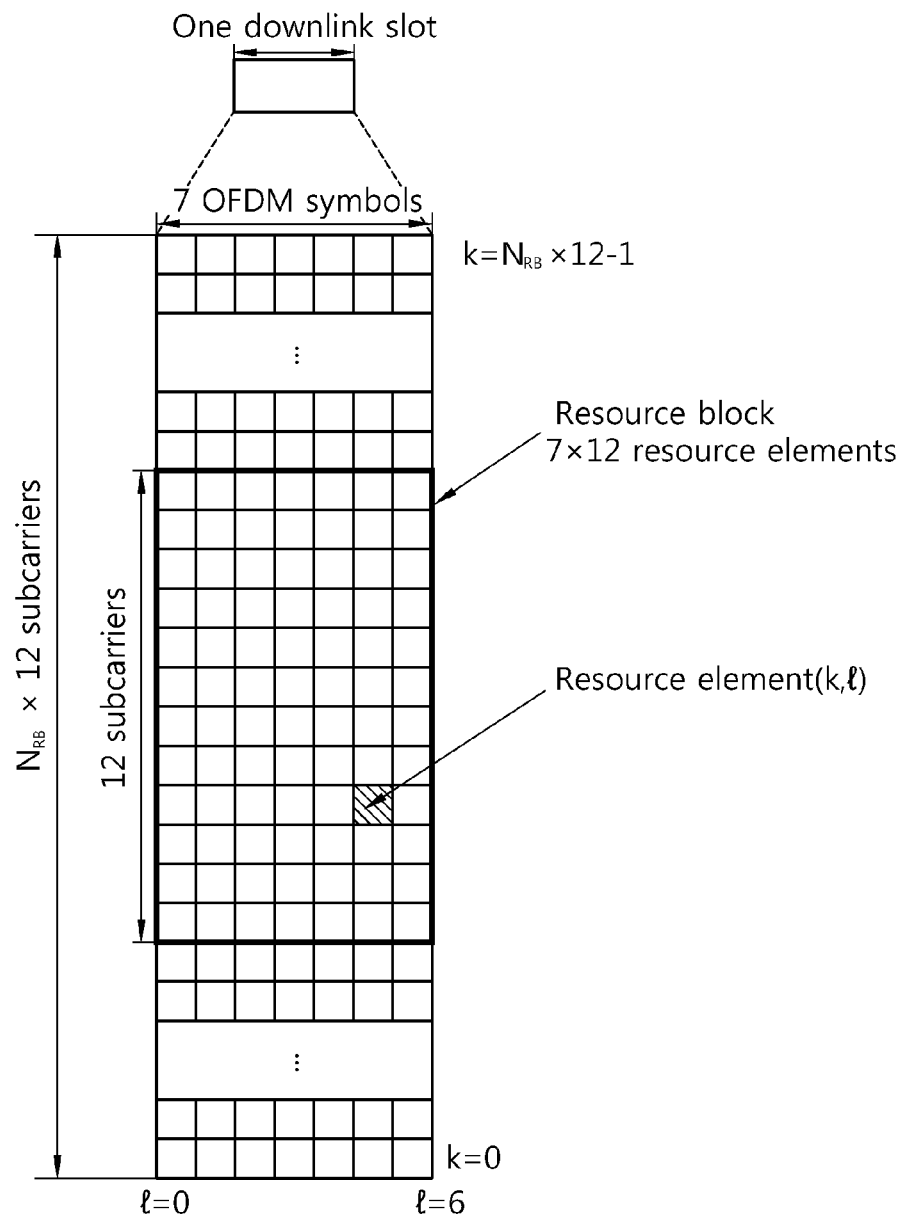
FIG. 4 shows an example of a resource grid of a single downlink slot.

FIG. 4 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k ($k=0, \ldots, N_{RB} \times 12-1$) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 5:
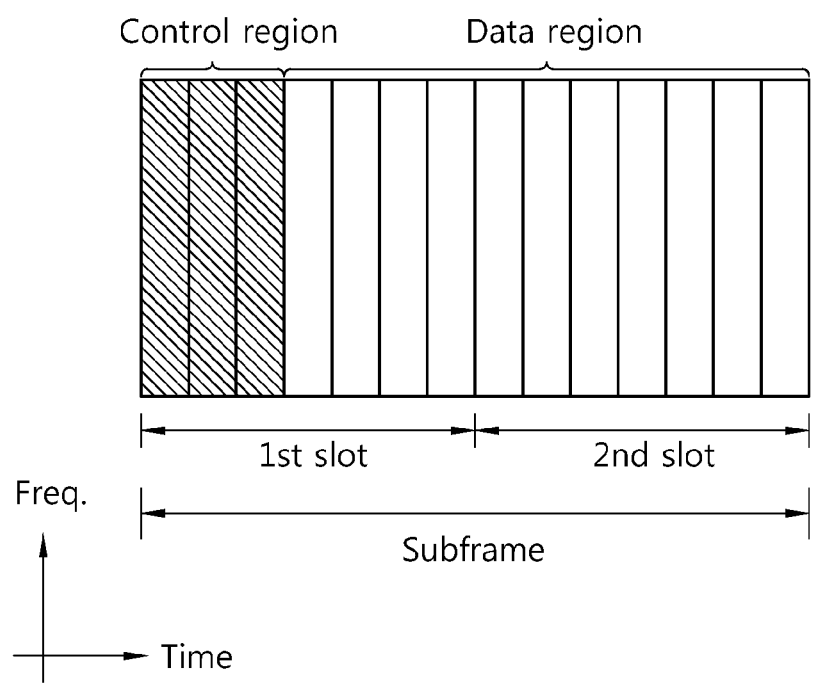
FIG. 5 shows the structure of a downlink subframe.

FIG. 5 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 6:
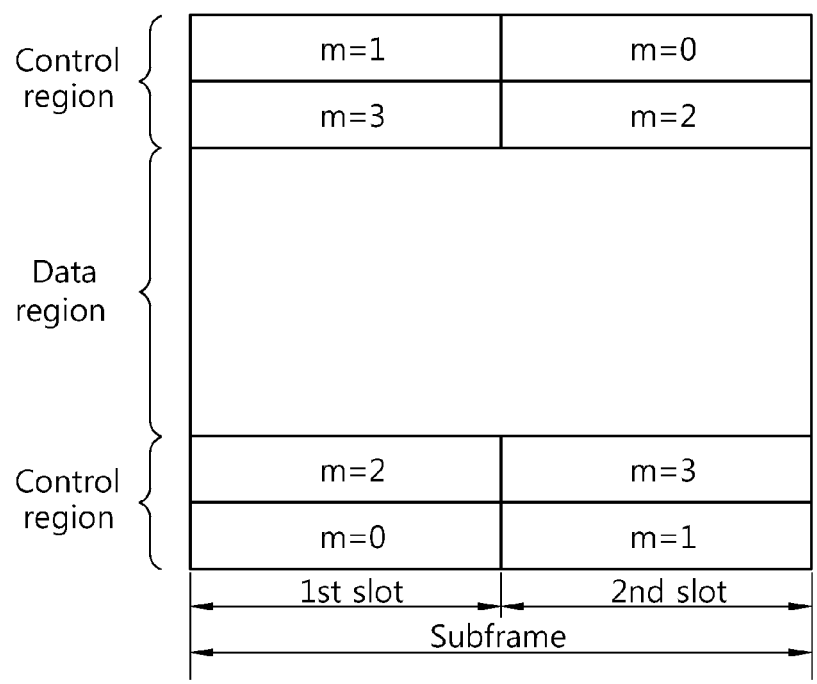
FIG. 6 shows the structure of an uplink subframe.

FIG. 6 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUSCH) for transmitting data is allocated to the data region. The user equipment does not transmit the PUCCH and the PUSCH simultaneously to maintain a single carrier property.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH is frequency-hopped at the slot boundary. The UE can obtain a frequency diversity gain by transmitting uplink control information through different subcarriers according to time. In FIG. 6, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR) as a request for uplink radio resource assignment, etc.

The PUCCH can support multiple formats. That is, it is possible to transmit a UL control signal having a different number of bits per subframe according to a modulation scheme. Table 1 below shows an example of the number of bits per subframe and a modulation scheme based on a PUCCH format.

TABLE 1

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

A PUCCH format 1 is used for transmission of an SR. A PUCCH format 1a or format 1b is used for transmission of an HARQ ACK/NACK signal. A PUCCH format 2 is used for transmission of a CQI. A PUCCH format 2a/2b is used for transmission of the CQI and the HARQ ACK/NACK signal.

When the HARQ ACK/NACK signal is transmitted alone in any subframe, the PUCCH format 1a or format 1b can be used, and when the SR is transmitted alone, the PUCCH format 1 can be used. The UE can transmit the HARQ ACK/NACK signal and the SR in the same subframe. For positive SR transmission, the UE can transmit the HARQ ACK/NACK signal by using a PUCCH resource assigned for the SR. For negative SR transmission, the UE can transmit the HARQ ACK/NACK signal by using a PUCCH resource assigned for the ACK/NACK.

The PUSCH is mapped to an uplink shared channel (UL-SCH) which is a transport channel. UL data transmitted on the PUSCH may be a transport block which is a data block for the UL-SCH transmitted during TTI. The transport block may be user information. Alternatively, the UL data may be multiplexed data. The multiplexed data may be attained by multiplexing control information and the transport block for the UL-SCH. Examples of the control information multiplexed to the data include a CQI, a precoding matrix indicator (PMI), an HARQ, a rank indicator (RI), etc. The UL data may consist of only control information.

A UL reference signal can be classified into a demodulation reference signal (DMRS) and a sounding reference signal (SRS). The DMRS is a reference signal used for channel estimation to demodulate a received signal. The DMRS can be combined with PUSCH or PUCCH transmission. The SRS is a reference signal transmitted for UL scheduling by a UE to a BS. The BS estimates a UL channel by using the received SRS, and the estimated UL channel is used in UL scheduling. The SRS is not combined with PUSCH or PUCCH transmission. The same type of base sequences can be used for the DMRS and the SRS. Meanwhile, precoding applied to the DMRS in UL multi-antenna transmission may be the same as precoding applied to the PUSCH. Cyclic shift separation is a primary scheme for multiplexing the DMRS. In an LTE-A system, the SRS may not be precoded, and may be an antenna-specific reference signal.

A reference signal sequence $r_{u,v}^{(\alpha)}(n)$ can be defined based on a base sequence $b_{u,v}(n)$ and a cyclic shift $\alpha$ according to Equation 1.

$$r_{u,v}^{(\alpha)}(n) = e^{j\alpha n} b_{u,v}(n), 0 \leq n < M_{sc}^{RS} \quad \text{[Equation 1]}$$

In Equation 1, $M_{sc}^{RS}(1 \leq m \leq N_{RB}^{max,UL})$ denotes a reference signal sequence length, where $M_{sc}^{RS} = m \ast N_{sc}^{RB}$. $N_{sc}^{RB}$ denotes a size of a resource block represented by the number of subcarriers in a frequency domain. $N_{RB}^{max,UL}$ denotes a maximum value of a UL bandwidth expressed by a multiple of $N_{sc}^{RB}$. A plurality of reference signal sequences can be defined by differently applying a cyclic shift value $\alpha$ from one base sequence.

The base sequence is divided into a plurality of groups. In this case, $u \in \{0, 1, \ldots, 29\}$ denotes a group index, and v denotes a base sequence index in a group. The base sequence depends on a base sequence length $M_{sc}^{RS}$. Each group includes one base sequence (i.e., v=0) having a length of $M_{sc}^{RS}$ with respect to m (where $1 \leq m \leq 5$), and includes two base sequences (i.e., v=0,1) having a length of $M_{sc}^{RS}$ with respect to m (where $6 \leq m \leq n_{RB}^{max,UL}$). The sequence group index u and the base sequence index v may vary over time similarly to group hopping or sequence hopping to be described below.

UL DMRS is a reference signal used for channel estimation to demodulate a received signal. A DMRS sequence for a PUSCH can be defined by Equation 2 below.

$$r^{PUSCH}(m \cdot M_{sc}^{RS} + n) = r_{u,v}^{(\alpha)}(n) \quad \text{[Equation 2]}$$

In Equation 2, and m=0, 1, . . . , n=0, . . . , $M_{sc}^{RS}$−1. Herein, $M_{sc}^{RS} = M_{sc}^{PUSCH}$.

A cyclic shift value is given by $\alpha = 2\pi n_{cs}/12$ in a slot, and $n_{cs}$ can be defined by Equation 3 below.

$$n_{cs} = (n_{DMRS}^{(1)} + n_{DMRS}^{(2)} + n_{PRS}(n_s)) \bmod 12 \quad \text{[Equation 3]}$$

In Equation 3, $n_{DMRS}^{(1)}$ is indicated by a parameter transmitted by a higher layer. Table 2 shows an example of a mapping relation with respect to the parameter $n_{DMRS}^{(1)}$.

TABLE 2

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Referring back to Equation 3, $n_{DMRS}^{(2)}$ can be defined by a cyclic shift field in a DCI format 0 for a transport block corresponding to PUSCH transmission. The DCI format is transmitted through a PDCCH. The cyclic shift field may have a length of 3 bits.

Table 3 shows an example of a mapping relation between the cyclic shift field and $n_{DMRS}(2)$.

TABLE 3

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

In a case where a PDCCH including the DCI format 0 is not transmitted in the same transport block, $n_{DMRS}^{(2)}$ may be 0 if an initial PUSCH is semi-persistently scheduled in the same transport block or if the initial PUSCH is scheduled by a random access response grant in the same transport block.

$n_{PRS}(n_s)$ can be defined by Equation 4 below.

$$n_{PRS}(n_s) = \sum_{i=0}^{7} c(8N_{symb}^{UL} \cdot n_s + i) \cdot 2^i \quad \text{[Equation 4]}$$

c(i) denotes a PN sequence as a pseudo-random sequence, and can be defined by a length-31 gold sequence. C(i) is applicable in a cell-specific manner. A pseudo-random sequence generator can be initialized to $$c_{init} = \left\lfloor \frac{N_{ID}^{cell}}{30} \right\rfloor \cdot 2^5 + f_{ss}^{PUSCH}$$

in a first part of each radio frame.

A DMRS sequence $r^{PUSCH}$ is multiplied by an amplitude scaling factor $\beta_{PUSCH}$, and is mapped in sequence to a physical transport block used in corresponding PUSCH transmission starting from $r^{PUSCH}(0)$. In one slot, the DMRS sequence is mapped to a 4th SC-FDMA symbols (i.e., having an SC-FDMA symbol index 3) in case of a normal CP, and is mapped to a 3rd SC-FDMA symbol (i.e., having an SC-FDMA symbol index 2) in case of an extended CP. Precoding applied to a UL DMRS in a multiple antenna system may be identical to precoding applied to the PUSCH.

The SRS is a reference signal transmitted by a relay station (RS) to a base station (BS) and is a reference signal which is not related to UL data or control signal transmission. In general, the SRS may be used for channel quality estimation for frequency selective scheduling in a UL or may be used for other usages. For example, the SRS may be used in power control, initial MCS selection, initial power control for data transmission, etc. In general, the SRS is transmitted in a last SC-FDMA symbol of one subframe.

An SRS sequence $r_{SRS}(n)$ is defined as $r_{u,v}^{(\alpha)}(n)$. u denotes a PUCCH sequence group index, and v denotes a base sequence index. A cyclic shift value α is defined by Equation 5.

$$\alpha = 2\pi \frac{n_{SRS}^{cs}}{8} \quad \text{[Equation 5]}$$

$n_{SRS}^{cs}$ denotes a value configured by a higher layer with respect to each UE, and may be any one integer in the range of 0 to 7.

Figure 7:
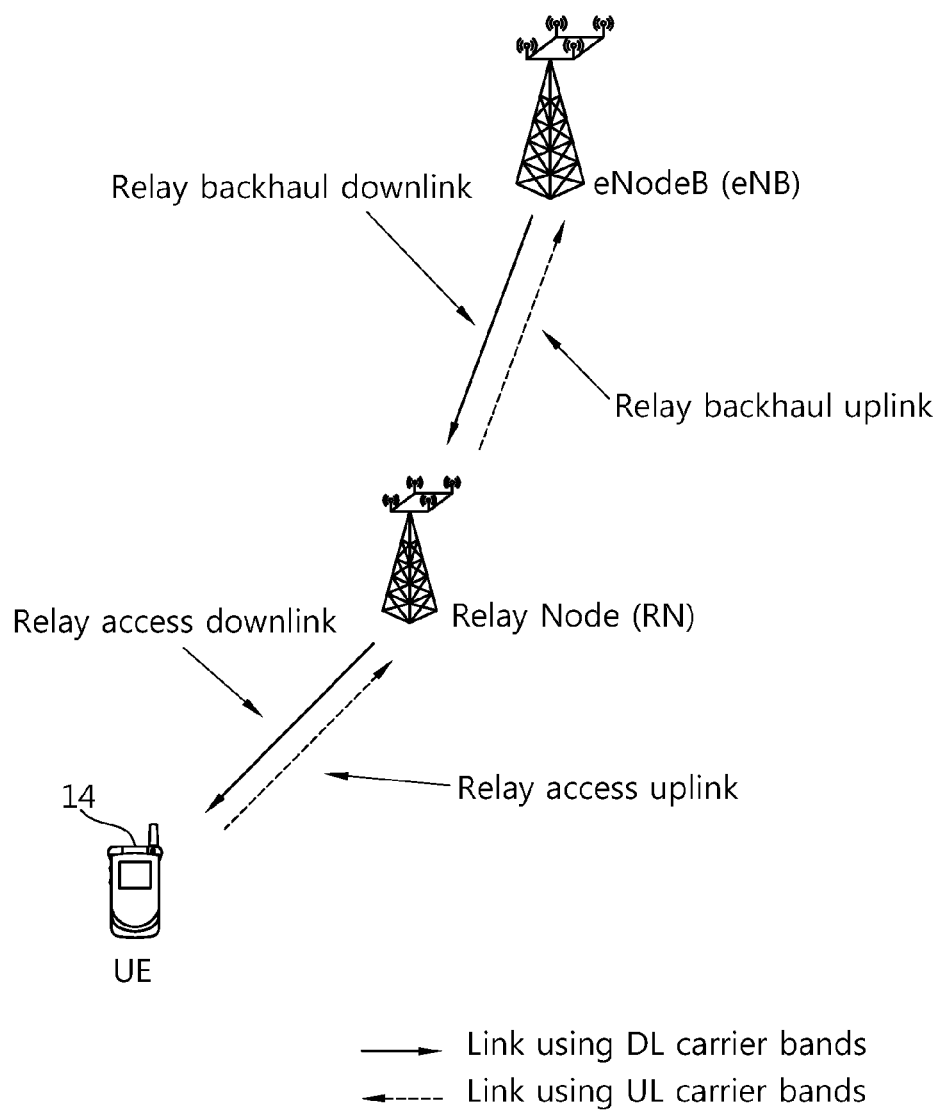
FIG. 7 shows another example of a wireless communication system using an RS.

FIG. 7 shows another example of a wireless communication system using an RS.

Two types of links each having a different attribute are respectively applied to UL and DL carrier bands between a BS and the RS or between the RS and a UE. The link established between the BS and the RS can be defined as a backhaul link. When the backhaul link is transmitted using a DL frequency band (in case of an FDD mode) or a DL subframe resource (in case of a TDD mode), it can be expressed by a backhaul DL. When the backhaul link is transmitted using a UL frequency band or a UL subframe resource, it can be expressed by a backhaul UL. The link established between the RS and the UE can be defined as an access link. When the access link is transmitted using the DL frequency band or the DL subframe resource, it can be expressed by an access DL. When the access link is transmitted using the UL frequency band or the UL subframe resource, it can be expressed by an access UL.

The BS and the UE each implement one of a transmission (Tx) module and a reception (Rx) module with respect to a UL or a DL. However, the RS needs to implement the Tx module and the Rx module with respect to both the UL and the DL. Table 4 shows an example of indicating whether a Tx or Rx module of a BS, an RS, and a UE is implemented. The BS includes a DL Tx module and a UL Rx module. The UE includes a DL Rx module and a UL Tx module. The RS includes the four modules.

TABLE 4

| Functionality | BS | RS | MS |
|---|---|---|---|
| DL Tx. | V | V | |
| DL Rx. | | V | V |
| UL Tx. | | V | V |
| UL Rx. | V | V | |

Figure 8:
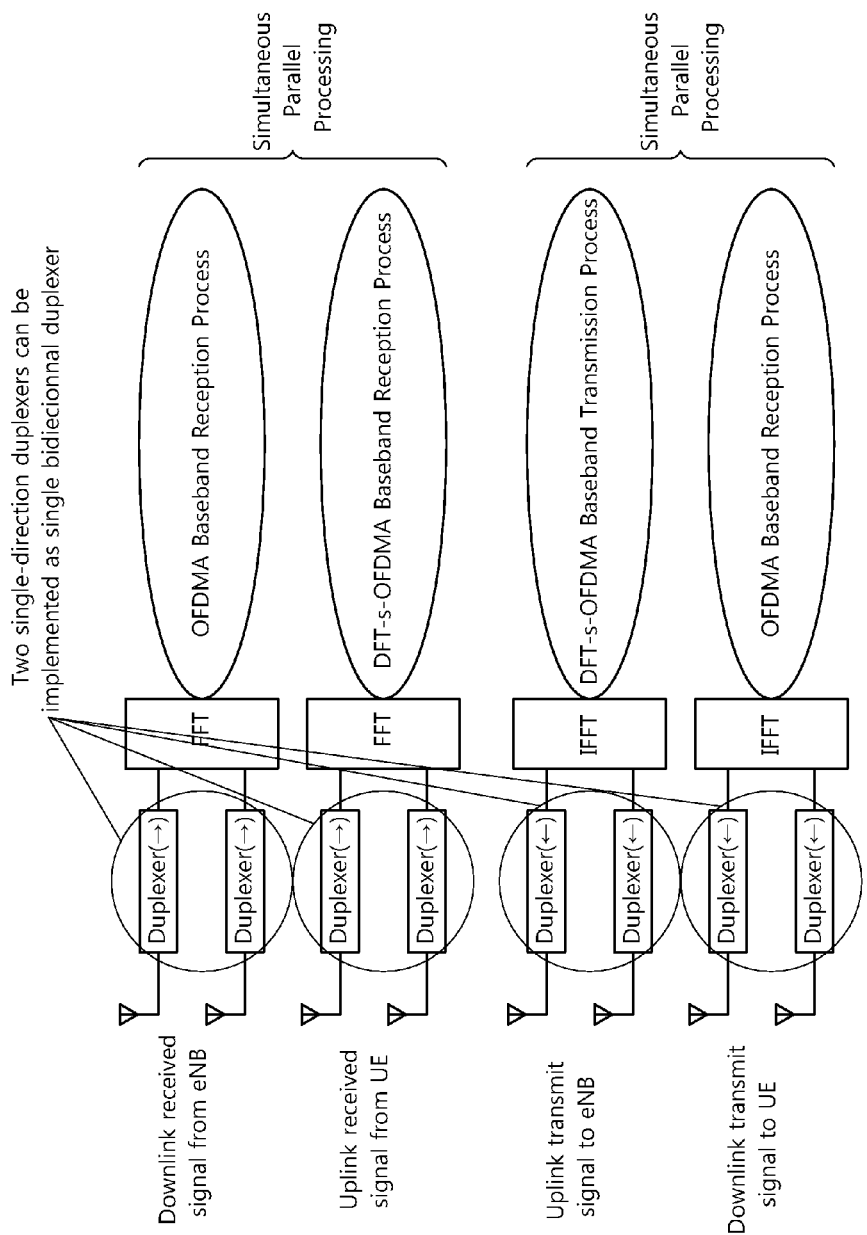
FIG. 8 is a block diagram for implementing an RS operating in an FDD mode.

FIG. 8 is a block diagram for implementing an RS operating in an FDD mode. Referring to FIG. 8, the RS includes a DL Rx module, a UL Rx module, a UL Tx module, and a DL Tx module. Each module includes a unidirectional duplexer. However, the unidirectional duplexers of the DL Rx module and the UL Tx module can be implemented by using one bi-directional duplexer. Likewise, the unidirectional duplexers of the UL Rx module and the UL Tx module can be implemented with one bi-directional duplexer. A DL Rx signal is subjected to fast Fourier transform (FFT), followed by an orthogonal frequency division multiple access (OFDMA) baseband reception process. The UL Rx signal is subjected to an FFT operation, followed by a discrete Fourier transform spreading (DFT-s) OFDMA baseband reception process. The DL Rx signal and the UL Rx signals can be simultaneously processed. The UL Tx signal is transmitted by being subjected to the DFT-s OFDMA baseband reception process and the FFT process. The DL Tx signal is transmitted by being subjected to the OFDMA baseband reception process and the FFT operation. The DL Rx signal and the UL Tx signal can be simultaneously processed.

Meanwhile, a 3GPP LTE-A system supports a carrier aggregation system. 3GPP TR 36.815 V9.0.0 (2010-3) may be incorporated herein by reference to describe the carrier aggregation system.

The carrier aggregation system implies a system that configures a broadband by aggregating one or more carriers having a bandwidth smaller than that of a target broadband when the wireless communication system intends to support the broadband. The carrier aggregation system can also be referred to as other terms such as a multiple carrier system, a bandwidth aggregation system, or the like. The carrier aggregation system can be divided into a contiguous carrier aggregation system in which carriers are contiguous to each other and a non-contiguous carrier aggregation system in which carriers are separated from each other. In the contiguous carrier aggregation system, a guard band may exist between carriers. A carrier which is a target when aggregating one or more carriers can directly use a bandwidth that is used in the legacy system in order to provide backward compatibility with the legacy system. For example, a 3GPP LTE system can support a bandwidth of 1.4 MHz, 3 MHz, 5 MHz, 10 MHz, 15 MHz, and 20 MHz, and a 3GPP LTE-A system can configure a broadband of 20 MHz or higher by using only the bandwidth of the 3GPP LTE system. Alternatively, the broadband can be configured by defining a new bandwidth without having to directly use the bandwidth of the legacy system.

In the carrier aggregation system, a UE can transmit or receive one or a plurality of carriers simultaneously according to capacity. An LTE-A UE can transmit or receive a plurality of carriers simultaneously. An LTE Rel-8 UE can transmit or receive only one carrier when each of carriers constituting the carrier aggregation system is compatible with an LTE Rel-8 system. Therefore, when the number of carriers used in the UL is equal to the number of carriers used in the DL, it is necessary to configure such that all component carriers are compatible with the LTE Rel-8 system.

In order to efficiently use a plurality of carriers, the plurality of carriers can be managed by media access control (MAC).

Figure 9:
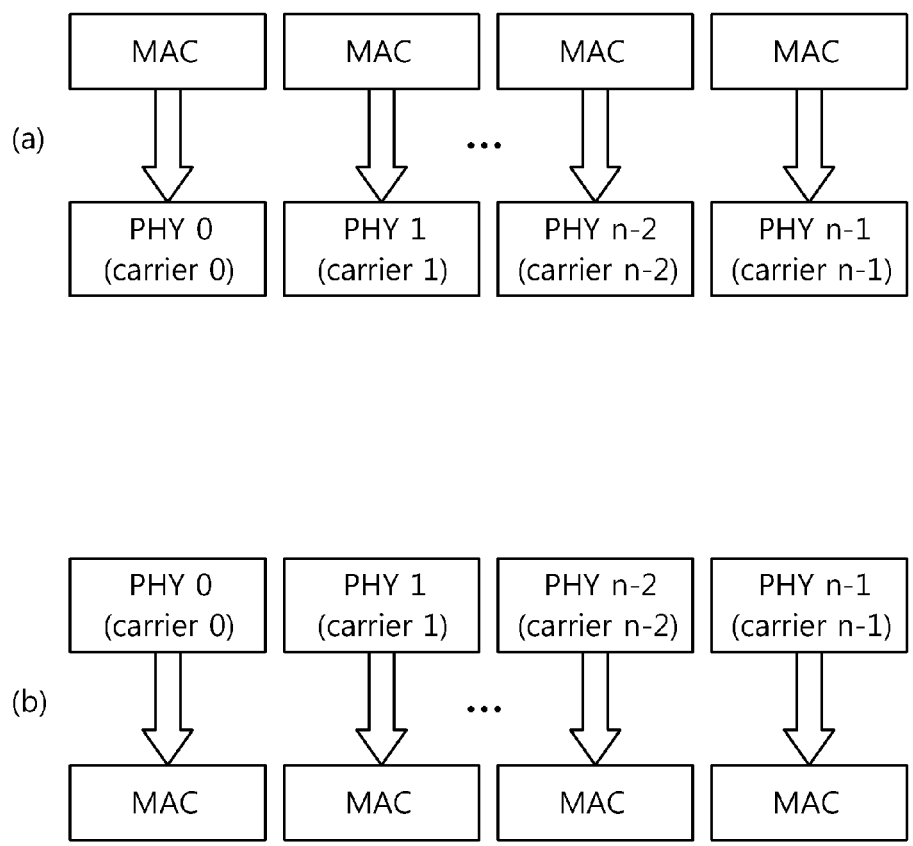
FIGS. 9 and 10 show an example of structures of a physical layer and a MAC layer in a carrier aggregation system.

FIG. 9 shows an example of structures of a physical layer and a MAC layer in a carrier aggregation system.

Referring to FIG. 9, one MAC manages only one component carrier (CC). That is, the MAC and the CC are 1:1 mapped. FIG. 9(a) shows a structure in a transmitter, and FIG. 9(b) shows a structure in a receiver. In a relation between an independent physical layer and an independent MAC layer in an individual CC, a MAC protocol data unit (PDU) packet block of the MAC layer is converted to a transport block via a logical transport layer and is then mapped to a physical layer input information block. In this case, a PDSCH is generated for each CC in the physical layer. In addition, a PDCCH for transmitting control information generated from a packet scheduler of the MAC layer can be transmitted by being mapped to a physical resource in the individual CC. In this case, a PDCCH for carrying a control signal related to UE-specific PDSCH or PUSCH transmission can be encoded by being distinguished for each CC in which the PDSCH or PUSCH is transmitted. This can be referred to as a separate coded PDCCH. Alternatively, a PDCCH for carrying a control signal related to PDSCH or PUSCH transmission of multiple individual carriers can be encoded by being configured as one entity. This can be referred to as a joint coded PDCCH.

Figure 10:
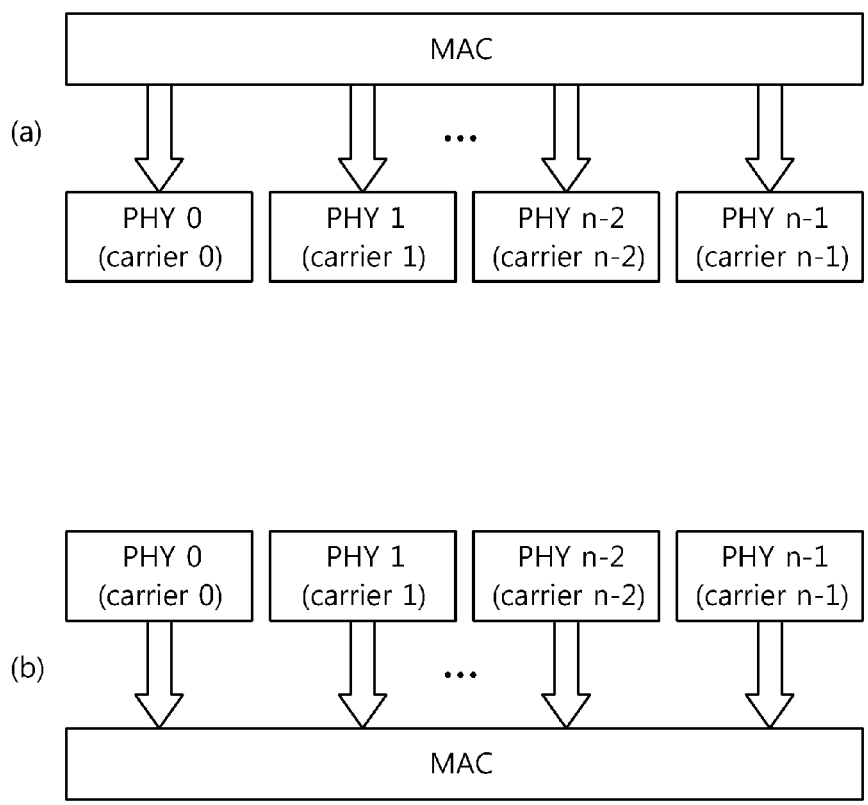

FIG. 10 shows another example of structures of a physical layer and a MAC layer in a carrier aggregation system. One MAC manages multiple CCs. FIG. 10(a) shows a structure in a transmitter, and FIG. 10(b) shows a structure in a receiver. From the perspective of a UE, one transport block and one HARQ entity may exist per CC. The UE can be scheduled simultaneously for a plurality of carriers. A mapping relation of the physical layer and the MAC layer shown in FIG. 9 and a PDSCH generation process and operation can equally apply to the example of FIG. 10.

Although it is shown in FIG. 9 and FIG. 10 that one MAC manages either one CC or all CCs, the present invention is not limited thereto. Thus, a mapping relation between the MAC and the CC can be combined variously.

In addition, the carrier aggregation system of FIG. 9 and FIG. 10 includes n carriers. The respective carriers may be contiguous to each other or may be separated from each other. The carrier aggregation system can apply both to UL and DL transmissions. In a TDD system, each carrier is configured to be able to perform UL transmission and DL transmission. In an FDD system, a plurality of carriers can be used by dividing them for a UL usage and a DL usage. In a typical TDD system, the number of CCs used in UL transmission is equal to that used in DL transmission, and each carrier has the same bandwidth. The FDD system can configure an asymmetric carrier aggregation system by allowing the number of carriers and the bandwidth to be different between UL and DL transmissions.

In order to support a carrier aggregation system in a wireless communication system including an RS, CCs can be assigned so that a control channel or data channel for a UE or RS for transmitting control information or data can be transmitted according to a situation for each specific UE or specific BS. In this case, when CC assignment information is controlled in L3 radio resource management (RRM), the CC assignment information can be transmitted through a UE- or RS-specific radio resource control (RRC) message. Alternatively, the CC assignment information can be transmitted through either a PDCCH or a dedicated PUCCH assigned for the CC assignment information. When the CC assignment information is controlled by a packet scheduler, the CC assignment information can be transmitted through the PDCCH, the dedicated PDCCH, or an L2 MAC message type PDCCH.

Hereinafter, a method of configuring a PUCCH for an RS (hereinafter, referred to as an R-PUCCH) will be described.

The R-PUCCH for transmitting a UL control signal for the RS needs to be configured differently from a PUCCH. Since the RS performs both transmission and reception, a guard time is required when a mode transition occurs from a Tx mode to a Rx mode or from the Rx mode to the Tx mode. Transmission or reception cannot be performed in a resource used as the guard time, and an amount of available resources is decreased. Accordingly, a method of configuring the R-PUCCH other than an SC-FDMA symbol used as the guard time is proposed.

Figure 11:
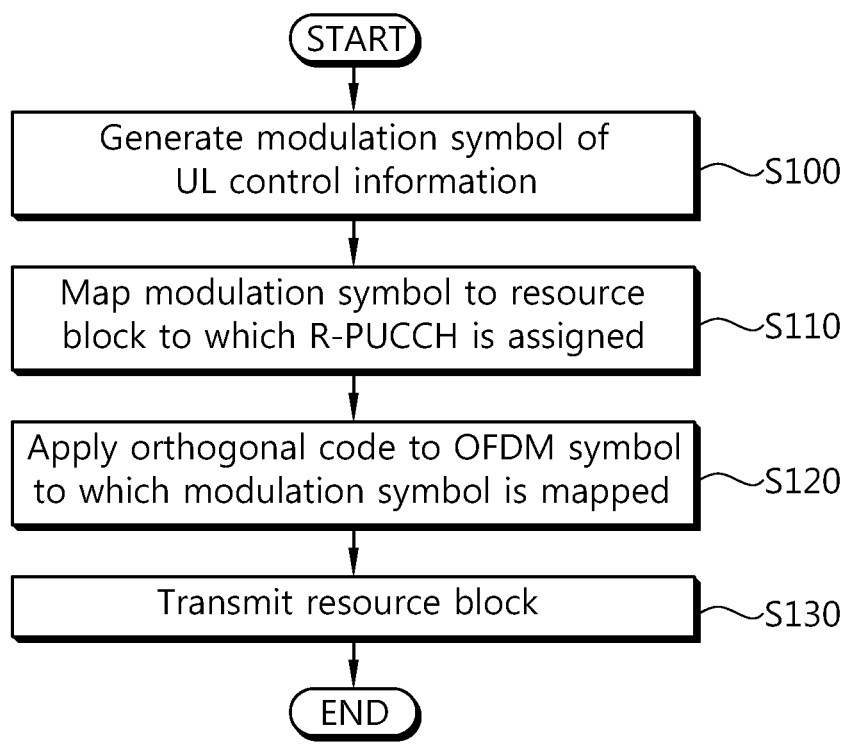
FIG. 11 shows the proposed method of transmitting a control signal of an RS according to an embodiment of the present invention.

FIG. 11 shows the proposed method of transmitting a control signal of an RS according to an embodiment of the present invention.

In step S100, the RS generates a modulation symbol of UL control information. In step S110, the RS maps the generated modulation symbol to a backhaul subframe to which an R-PUCCH is assigned. In step S120, the RS applies an OC sequence to an SC-FDMA symbol to which the modulation symbol is mapped among SC-FDMA symbols constituting the backhaul subframe. In step S130, the RS transmits the backhaul subframe. A guard time of the backhaul subframe to which a modulation symbol of the UL control information will be mapped can be taken into account. The guard time can be arranged in the backhaul subframe in various structures.

First, a case where the present invention is applied when UL backhaul subframe Tx timing of the RS is aligned with UL backhaul subframe Rx timing of the BS will be described.

Figure 12:
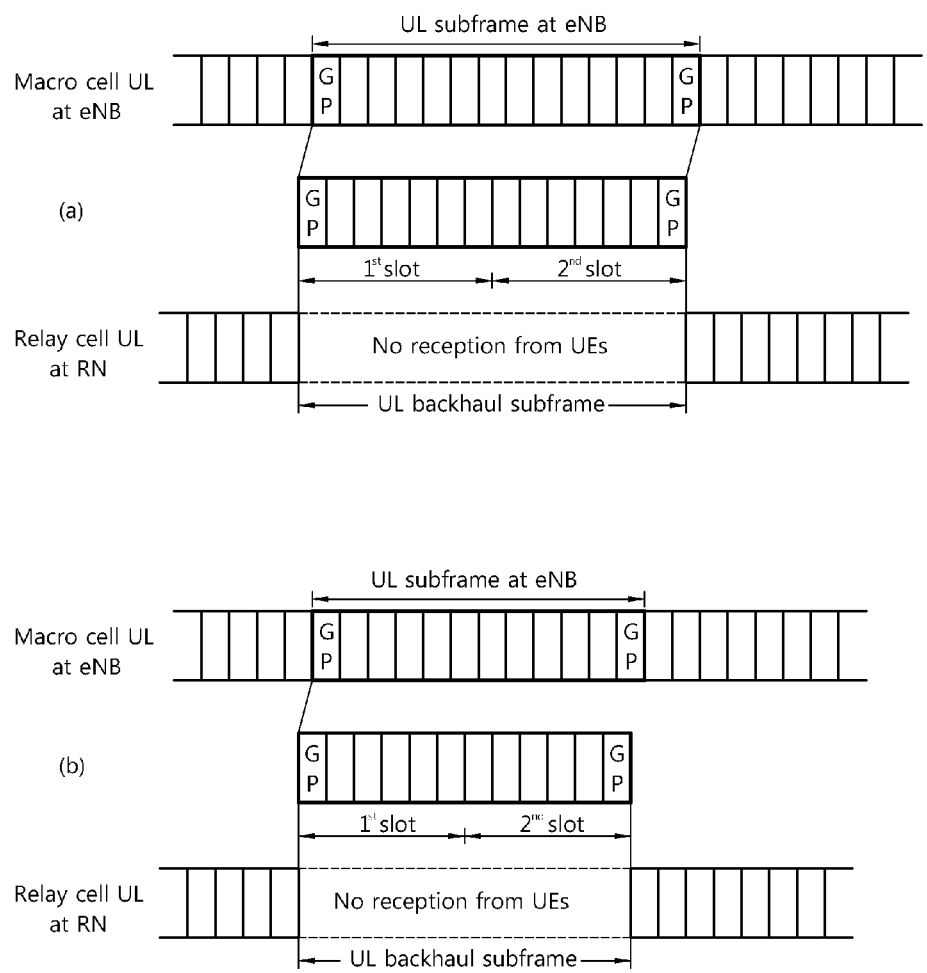
FIG. 12 shows an example of arranging a guard time in a UL backhaul subframe.

FIG. 12 shows an example of arranging a guard time in a UL backhaul subframe. FIG. 12(a) shows a case where a UL backhaul subframe of the RS has a normal CP structure. FIG. 12(b) shows a case where a UL backhaul subframe of the RS has an extended CP structure. In an initial network entry of the RS, the BS synchronizes the UL backhaul subframe timing of the RS according to a UL timing value regulated through a random access channel (RACH) procedure. In this case, first and last SC-FDMA symbols of the given backhaul UL subframe are assigned as a guard time. Accordingly, in the normal CP structure of FIG. 12(a), 12 SC-FDMA symbols out of 14 SC-FDMA symbols can be used for UL backhaul transmission, and in the extended CP structure of FIG. 12(b), 10 SC-FDMA symbols out of 12 SC-FDMA symbols can be used for UL backhaul transmission.

The BS can assign one or more physical resource blocks (PRBs) semi-statically for R-PUCCH transmission of the RS. The assigned PRB can be signaled to each RS through a higher layer message. The higher layer message can be broadcast to all RSs in a cell by being signaled in a cell-specific manner, or can be unicast to each RS by being signaled in an RS-specific manner. To obtain a diversity gain in R-PUCCH transmission, similarly to PUCCH transmission, slot hopping can be applied in a PRB reserved for R-PUCCH transmission.

The R-PUCCH can also support multiple formats similarly to the PUCCH. According to a modulation scheme, a different number of UL control signals can be transmitted per subframe.

An R-PUCCH format 1 is used for HARQ ACK/NACK feedback, and can be classified into three formats according to the number of bits to be fed back. An R-PUCCH format 1a is used for 1-bit ACK/NACK feedback for one codeword, and generates a symbol by using a binary phase shift keying (BPSK) modulation scheme. An R-PUCCH format 1b is used for 2-bit ACK/NACK feedback for two codewords, and generates a symbol by using a quadrature phase shift keying (QPSK) modulation. An R-PUCCH format 1c is used for 4-bit ACK/NACK feedback for four codewords, and generates a symbol by using a 16-quadrature amplitude modulation (QAM) modulation scheme. A length-12 constant amplitude zero auto-correlation (CAZAC) sequence is applied to a modulated symbol and is then mapped to 12 subcarriers of one SC-FDMA symbol in one PRB. A cyclic shift can be applied when the modulated symbol is mapped to a slot and an SC-FDMA symbol.

The BS can assign a dedicated R-PUCCH resource and sequence for each RS through higher layer signaling. In addition, according to an antenna configuration of the RS or a link state between the BS and the RS, multiple R-PUCCH resources and sequences can be assigned to one RS so as to support the maximum number of codewords that can be transmitted through the R-PDSCH. Among the R-PUCCH formats, the R-PUCCH format 1c may be (or may not be) supported for each RS according to a state of a backhaul link. The number of R-PUCCH resources and sequences of each RS may vary depending on whether the R-PUCCH format 1c is supported.

In addition, without having to assign an additional PRB for R-PUCCH format-1 transmission, the RS can transmit ACK/NACK by multiplexing it with a PUCCH for a 3GPP LTE Rel-8 system. In this case, R-PUCCH transmission of the RS may be performed only in a 2nd slot. In order to ensure quality of service (QoS) for ACK/NACK transmission in one RS, one ACK/NACK signal can be transmitted through multiple PRBs in the 2nd slot.

FIG. 13 shows an example of an R-PUCCH structure according to the proposed control signal transmission method of an RS. In the example of FIG. 13, a UL backhaul subframe has a normal CP structure, and has an R-PUCCH structure for R-PUCCH format-1 transmission.

When control signal transmission of the RS through an R-PUCCH is performed based on one slot, two slots constituting the UL backhaul subframe may have the same R-PUCCH structure. In a 1st slot of FIG. 13(a), a demodulation reference signal (DMRS) of a control signal is mapped to 3rd to 5th SC-FDMA symbols, and an ACK/NACK signal is mapped to 2nd, 6th, and 7th SC-FDMA symbols. In a 2nd slot, the DMRS is mapped to 9th to 11th SC-FDMA symbols, and the ACK/NACK signal is mapped to 8th, 12th, and 13th SC-FDMA symbols. That is, the same R-PUCCH structure is configured in two slots except for a guard time. FIG. 13(b) is different from FIG. 13(a) in that the DMRS and the ACK/NACK signal are mapped to different positions, but is the same as FIG. 13(a) in that the same R-PUCCH structure is also configured in the two slots. In addition thereto, an R-PUCCH structure in which the same R-PUCCH structure is configured in two slots can be used. Further, an orthogonal cover (OC) sequence can be applied to the DMRS and the ACK/NACK signal of each slot. In FIG. 13, a length-3 discrete Fourier transform (DFT) sequence can be used as the OC sequence for the DMRS and the ACK/NACK signal. However, the present invention is not limited thereto, and thus various types of orthogonal sequences (e.g., a Walsh code, etc.) can be used as the OC sequence.

Figure 14:
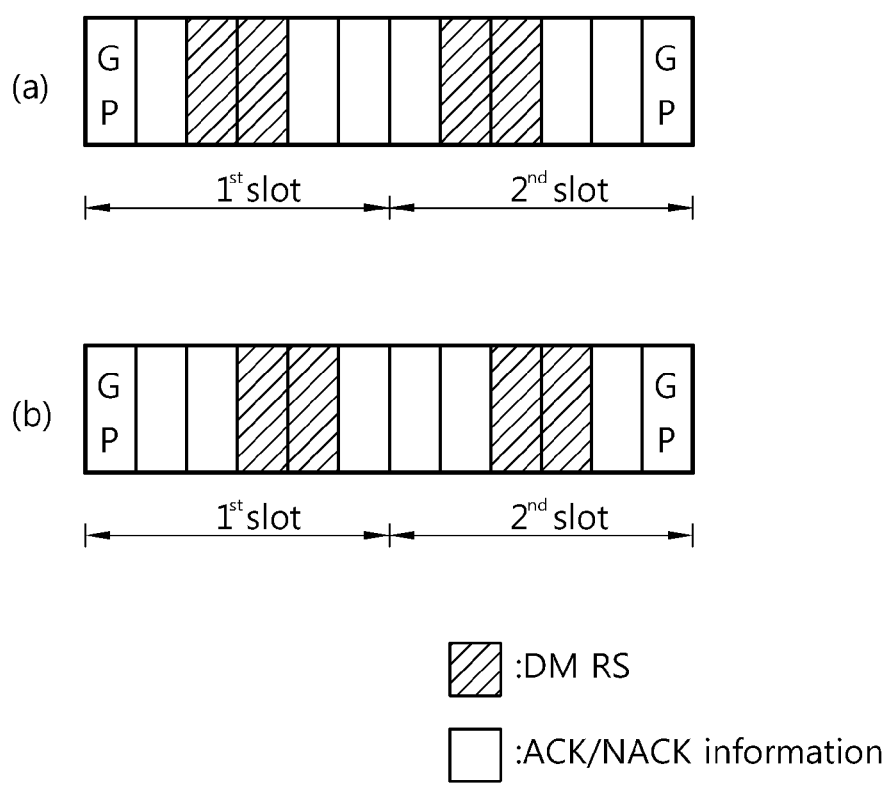

FIG. 14 shows another example of an R-PUCCH structure according to the proposed control signal transmission method of an RS. In the example of FIG. 14, a UL backhaul subframe has an extended CP structure, and has an R-PUCCH structure for R-PUCCH format-1 transmission. In a $1^{st}$ slot of FIG. 14(a), a DMRS is mapped to $3^{rd}$ and $4^{th}$ SC-FDMA symbols, and an ACK/NACK signal is mapped to $2^{nd}$, $5^{th}$, and $6^{th}$ SC-FDMA symbols. In a $2^{nd}$ slot, the DMRS is mapped to $9^{th}$ and $10^{th}$ SC-FDMA symbols, and the ACK/NACK signal is mapped to $7^{th}$, $10^{th}$, and $11^{th}$ SC-FDMA symbols. That is, the same R-PUCCH structure is configured in two slots except for a guard time. FIG. 14(b) is different from FIG. 14(a) in that the DMRS and the ACK/NACK signal are mapped to different positions, but is the same as FIG. 14(a) in that the same R-PUCCH structure is also configured in the two slots. In addition thereto, an R-PUCCH structure in which the same R-PUCCH structure is configured in two slots can be used. An OC sequence can be applied to the DMRS and the ACK/NACK signal of each slot. In FIG. 14, a length-2 Hadamard sequence can be used as the OC sequence for the DMRS, and a length-3 DFT sequence can be used as the OC sequence for the ACK/NACK signal. However, the present invention is not limited thereto, and thus various types of orthogonal sequences can be used as the OC sequence.

An R-PUCCH format 2 is used for CQI feedback. A symbol is generated by using a QPSK or 16-QAM modulation scheme, and one SC-FDMA symbol in one PRB is mapped to 12 subcarriers by applying a length-12 CAZAC sequence to a modulated symbol. When the modulated symbol is mapped to a slot and an SC-FDMA symbol, a cyclic shift can be applied. The BS can assign an R-PUCCH resource and sequence for the R-PUCCH format 2 for each RS through higher layer signaling. A modulation scheme of the R-PUCCH format 2 can be assigned for each RS. In addition, the RS can transmit ACK/NACK by multiplexing it to a PUCCH for a 3GPP LTE Rel-8 system without having to assign an additional PRB for R-PUCCH format-1 transmission.

An SR can be transmitted by using the R-PUCCH format 1 or the R-PUCCH format 2. A resource for SR signal transmission, a sequence index, or a modulation scheme can be assigned for each RS through higher layer signaling.

FIG. 15 and FIG. 16 show other examples of an R-PUCCH structure according to the proposed control signal transmission method of an RS. In this case, an SR is transmitted based on the R-PUCCH format 1. FIG. 15(b) corresponds to FIG. 13(a), and FIG. 15(c) corresponds to FIG. 13(b). FIG. 16(b) corresponds to FIG. 14(a), and FIG. 16(c) corresponds to FIG. 14(b). That is, the same R-PUCCH structure is configured in two slots except for a guard time. However, this is different from FIG. 13 and FIG. 14 in that a DMRS is not transmitted. An SR signal is transmitted only through an SC-FDMA symbol corresponding to a sequence 1 of FIG. 15 and FIG. 16, and no signal is transmitted in an SC-FDMA symbol corresponding to a sequence 2. In each slot, an OC sequence can be applied to the SR signal In FIG. 15, a length-6 orthogonal sequence is applied by being split into two parts. In FIG. 16, a length-5 orthogonal sequence is applied by being split into two parts.

By directly using the R-PUCCH structure of FIG. 13 and FIG. 14, an R-PUCCH can be configured by using a part to which a DMRS and SR information are mapped. As a modulation scheme, any one of QPSK, 16-QAM, and 64-QAM can be used. According to the modulation scheme, quantized buffer statue information can be included in an SC-FDMA symbol in which the SR information is transmitted, and thus an amount of UL resources assigned by the BS to the RS can be determined. Alternatively, an R-PUCCH structure of the R-PUCCH format 2 can be used, and the quantized buffer state information can be fed back instead of a CQI.

The present invention is also applicable to a case where UL backhaul subframe Tx timing of the RS is delayed by a ½ SC-FDMA symbol in comparison with a UL backhaul subframe Rx timing of the BS.

Figure 17:
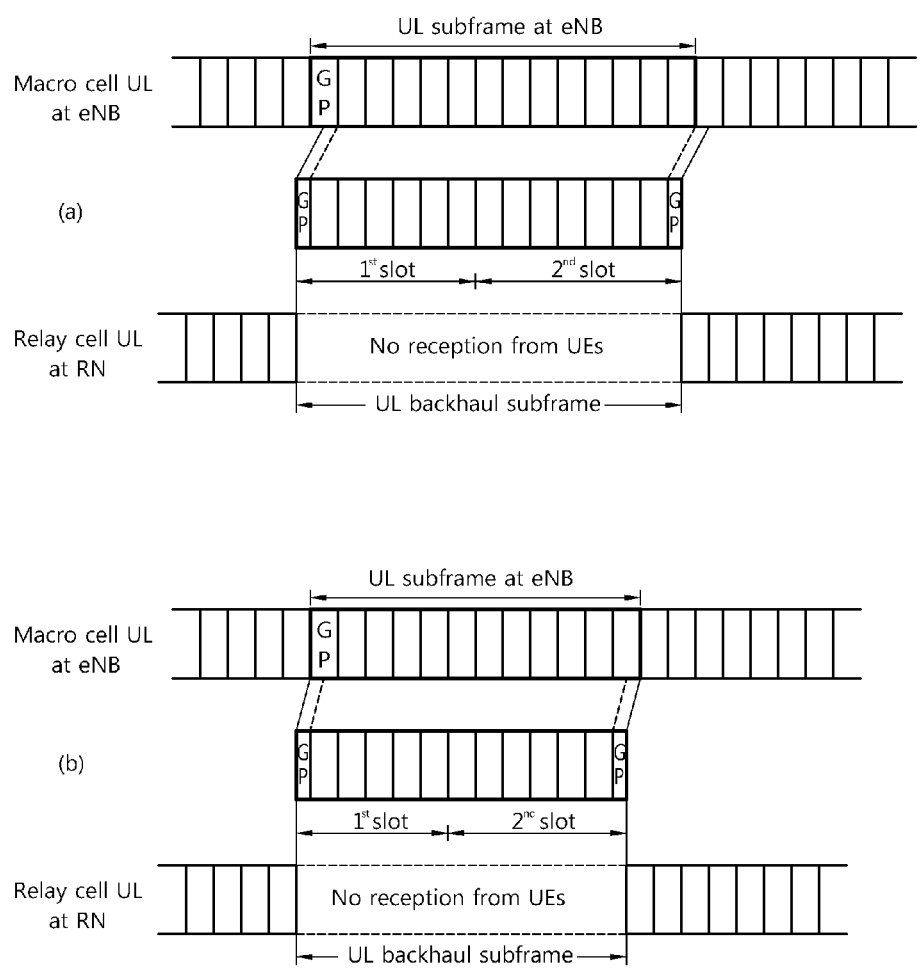
FIG. 17 shows another example of arranging a guard time in a UL backhaul subframe.

FIG. 17 shows another example of arranging a guard time in a UL backhaul subframe. FIG. 17(a) shows a case where a UL backhaul subframe of an RS has a normal CP structure. FIG. 17(b) shows a case where a UL backhaul subframe of an RS has an extended CP structure. A BS synchronizes the UL backhaul subframe timing of the RS according to a value obtained by adding a length of the ½ SC-FDMA symbol to a UL timing value regulated through an RACH procedure in an initial network entry of the RS. In this case, a first ½ SC-FDMA symbol and a last ½ SC-FDMA symbol of a given backhaul UL subframe are assigned as a guard time. Accordingly, among 14 SC-FDMA symbols in the normal CP structure of FIG. 17(a), 13 SC-FDMA symbols are available for UL backhaul transmission, and a $1^{st}$ slot includes 6 SC-FDMA symbols and a $2^{nd}$ slot includes 7 SC-FDMA symbols. Among 12 SC-FDMA symbols in the extended CP structure of FIG. 17(b), 11 SC-FDMA symbols are available for UL backhaul transmission, and a $1^{st}$ slot includes 5 SC-FDMA symbols and a $2^{nd}$ slot includes 6 SC-FDMA symbols.

Figure 18:
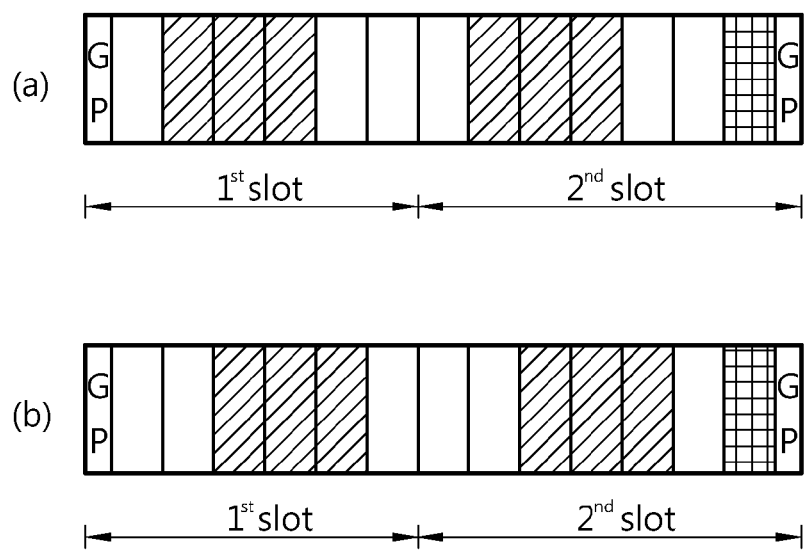
FIGS. 18 and 19 show another example of an R-PUCCH structure according to the proposed control signal transmission method of an RS.

FIG. 18 shows another example of an R-PUCCH structure according to the proposed control signal transmission method of an RS. In the example of FIG. 18, a UL backhaul subframe has a normal CP structure, and has an R-PUCCH structure for R-PUCCH format-1 transmission. In a 1st slot of FIG. 18(a), a DMRS is mapped to 2nd to 4th SC-FDMA symbols, and an ACK/NACK signal is mapped to 1st, 5th, and 6th SC-FDMA symbols. In a 2nd slot, the DMRS is mapped to 8th to 10th SC-FDMA symbols, the ACK/NACK signal is mapped to 7th, 11th, and 12th SC-FDMA symbols, and an SRS is mapped to a 13th SC-FDMA symbol. That is, the same R-PUCCH structure is configured in two slots except for a guard time and an SC-FDMA symbol to which the SRS is mapped. In addition thereto, an R-PUCCH structure in which the same R-PUCCH structure is configured in two slots can be used. A shortened PUCCH format 1 can be applied in the 2nd slot. That is, an ACK/NACK signal mapped to a last SC-FDMA symbol can be punctured. FIG. 18(b) is different from FIG. 18(a) in that the DMRS and the ACK/NACK signal are mapped to different positions, but is the same as FIG. 18(a) in that the same R-PUCCH structure is also configured in the two slots. In addition, a length-3 DFT sequence can be used for the DMRS and the ACK/NACK signal of each slot. Although a case where the SRS is mapped to the last SC-FDMA symbol of the 2nd slot is described for example in FIG. 18, the SRS can be mapped to the 1st SC-FDMA symbol of the 2nd slot, and the R-PUCCH structure of FIG. 18 can be also used for a case where the SRS is not transmitted.

Figure 19:
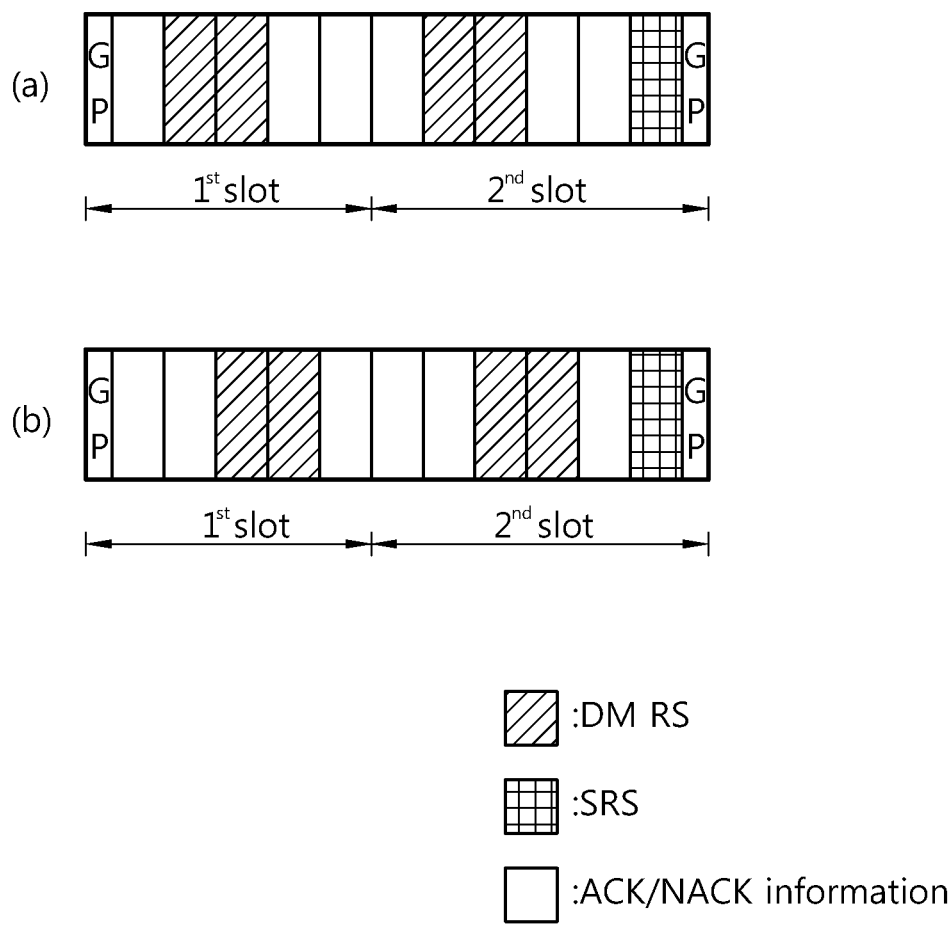

FIG. 19 shows another example of an R-PUCCH structure according to the proposed control signal transmission method of an RS. In the example of FIG. 19, a UL backhaul subframe has an extended CP structure, and has an R-PUCCH structure for R-PUCCH format-1 transmission. In a 1st slot of FIG. 19(a), a DMRS is mapped to 2nd and 3rd SC-FDMA symbols, and an ACK/NACK signal is mapped to 1st, 4th, and 5th SC-FDMA symbols. In a 2nd slot, the DMRS is mapped to 7th and 8th SC-FDMA symbols, the ACK/NACK signal is mapped to 5th, 9th, and 10th SC-FDMA symbols, and an SRS is mapped to a 11th SC-FDMA symbol. That is, the same R-PUCCH structure is configured in two slots except for a guard time and an SC-FDMA symbol to which the SRS is mapped. In addition thereto, an R-PUCCH structure in which the same R-PUCCH structure is configured in two slots can be used. A shortened PUCCH format 1 can be applied in the 2nd slot. That is, an ACK/NACK signal mapped to a last SC-FDMA symbol can be punctured. FIG. 19(b) is different from FIG. 19(a) in that the DMRS and the ACK/NACK signal are mapped to different positions, but is the same as FIG. 19(a) in that the same R-PUCCH structure is also configured in the two slots. In addition, a length-3 DFT sequence can be used for the DMRS and the ACK/NACK signal of each slot. Although a case where the SRS is mapped to the last SC-FDMA symbol of the 2nd slot is described for example in FIG. 19, the SRS can be mapped to the 1st SC-FDMA symbol of the 2nd slot, and the R-PUCCH structure of FIG. 19 can be also used for a case where the SRS is not transmitted.

The BS can assign a dedicated R-PUCCH resource and sequence for each RS through higher layer signaling. In addition, according to an antenna configuration of the RS or a link state between the BS and the RS, multiple R-PUCCH resources and sequences can be assigned to one RS so as to support the maximum number of codewords that can be transmitted through the R-PDSCH. In addition, without having to assign an additional PRB for R-PUCCH format-1 transmission, the RS can transmit ACK/NACK by multiplexing it with a PUCCH for a 3GPP LTE Rel-8 system. In this case, R-PUCCH transmission of the RS may be performed only in a 2nd slot. In order to ensure QoS for ACK/NACK transmission in one RS, one ACK/NACK signal can be transmitted through multiple PRBs in the 2nd slot.

The present invention is also applicable to a case where UL backhaul subframe Tx timing of the RS is advanced by a ½ SC-FDMA symbol in comparison with a UL backhaul subframe Rx timing of the BS.

Figure 20:
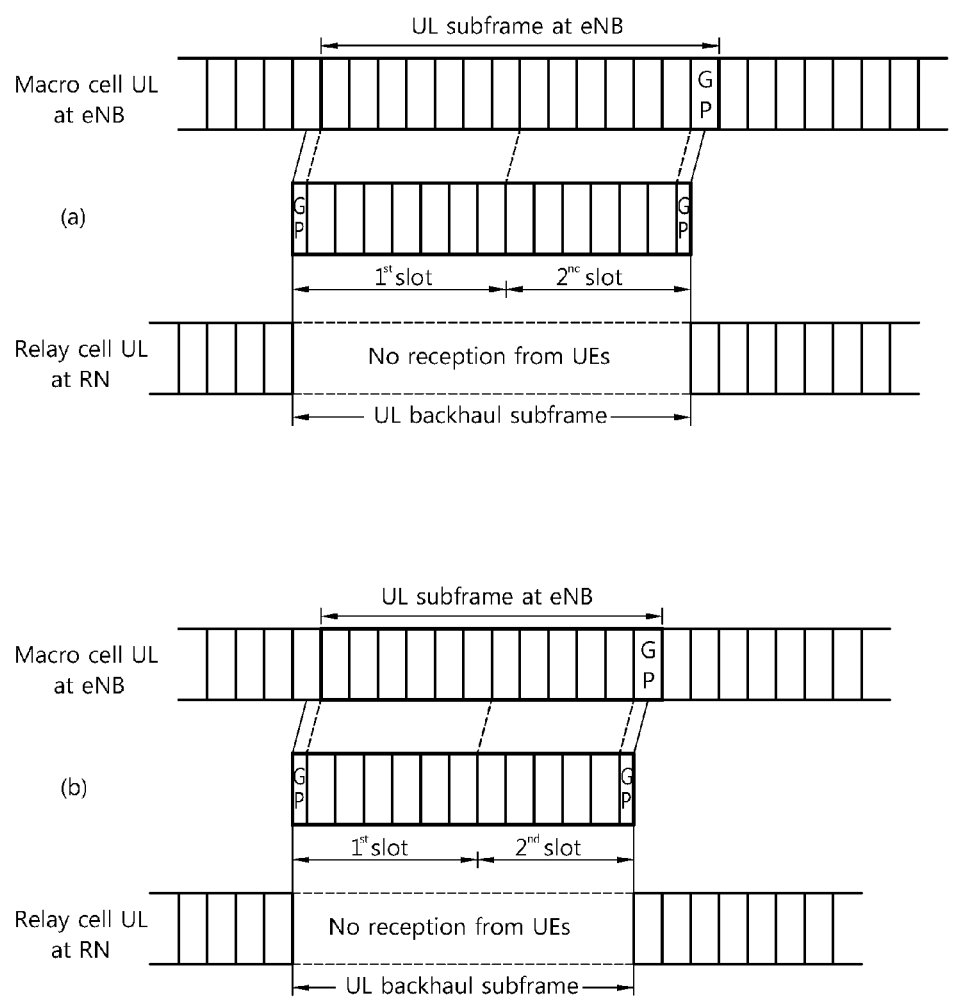
FIG. 20 shows another example of arranging a guard time in a UL backhaul subframe.

FIG. 20 shows another example of arranging a guard time in a UL backhaul subframe. FIG. 20(a) shows a case where a UL backhaul subframe of an RS has a normal CP structure. FIG. 20(b) shows a case where a UL backhaul subframe of an RS has an extended CP structure. A BS synchronizes the UL backhaul subframe timing of the RS according to a value obtained by subtracting a length of the ½ SC-FDMA symbol from a UL timing value regulated through an RACH procedure in an initial network entry of the RS. In this case, a first ½ SC-FDMA symbol and a last ½ SC-FDMA symbol of a given backhaul UL subframe are assigned as a guard time. Accordingly, among 14 SC-FDMA symbols in the normal CP structure of FIG. 20(a), 13 SC-FDMA symbols are available for UL backhaul transmission, and a $1^{st}$ slot includes 7 SC-FDMA symbols and a $2^{nd}$ slot includes 6 SC-FDMA symbols. Among 12 SC-FDMA symbols in the extended CP structure of FIG. 20(b), 11 SC-FDMA symbols are available for UL backhaul transmission, and a 1$^{st}$ slot includes 6 SC-FDMA symbols and a 2$^{nd}$ slot includes 5 SC-FDMA symbols.

Figure 21:
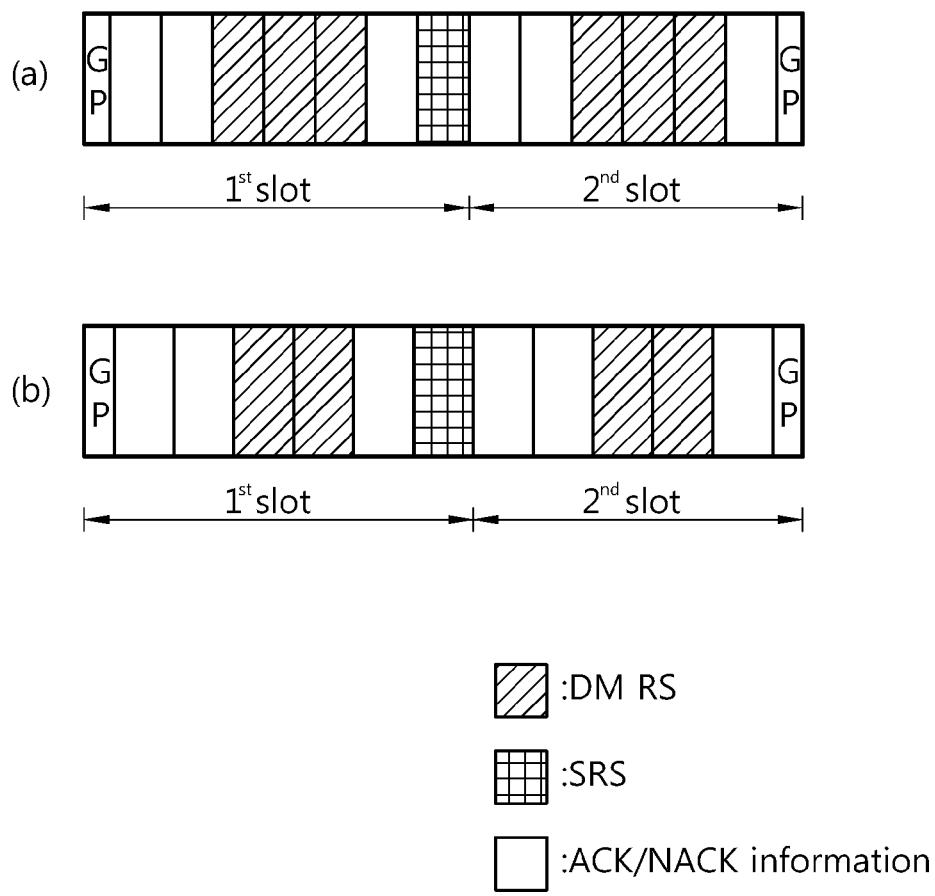
FIGS. 21 and 22 show another example of an R-PUCCH structure according to the proposed control signal transmission method of an RS.

FIG. 21 shows another example of an R-PUCCH structure according to the proposed control signal transmission method of an RS. The R-PUCCH structure of FIG. 21 is for R-PUCCH format-1 transmission. FIG. 21(a) shows a case where a UL backhaul subframe has a normal CP structure. FIG. 21(b) shows a case where a UL backhaul subframe has an extended CP structure. In a 1st slot of FIG. 21(a), a DMRS is mapped to 3rd to 5th SC-FDMA symbols, and an ACK/NACK signal is mapped to 1st, 2nd, and 6th SC-FDMA symbols. An SRS is mapped to a 7th SC-FDMA symbol. In a 2nd slot, the DMRS is mapped to 10th to 12th SC-FDMA symbols, and the ACK/NACK signal is mapped to 8th, 9th, and 13th SC-FDMA symbols. The same R-PUCCH structure is configured in two slots except for a guard time and an SC-FDMA symbol to which the SRS is mapped. In addition thereto, an R-PUCCH structure in which the same R-PUCCH structure is configured in two slots can be used. A shortened PUCCH format 1 can be applied in the 1st slot. That is, an ACK/NACK signal mapped to a last SC-FDMA symbol of the 1st slot can be punctured. In addition, a length-3 DFT sequence can be used for the ACK/NACK signal of each slot. Although a case where the SRS is mapped to the last SC-FDMA symbol of the 1st slot is described for example in FIG. 21, the SRS can be mapped to the 1st SC-FDMA symbol of the 1st slot.

The BS can assign a dedicated R-PUCCH resource and sequence for each RS through higher layer signaling In addition, according to an antenna configuration of the RS or a link state between the BS and the RS, multiple R-PUCCH resources and sequences can be assigned to one RS so as to support the maximum number of codewords that can be transmitted through the R-PDSCH. In addition, without having to assign an additional PRB for R-PUCCH format-1 transmission, the RS can transmit ACK/NACK by multiplexing it with a PUCCH for a 3GPP LTE Rel-8 system. In this case, R-PUCCH transmission of the RS may be performed only in a 2nd slot. In order to ensure QoS for ACK/NACK transmission in one RS, one ACK/NACK signal can be transmitted through multiple PRBs in the 2nd slot.

Figure 22:
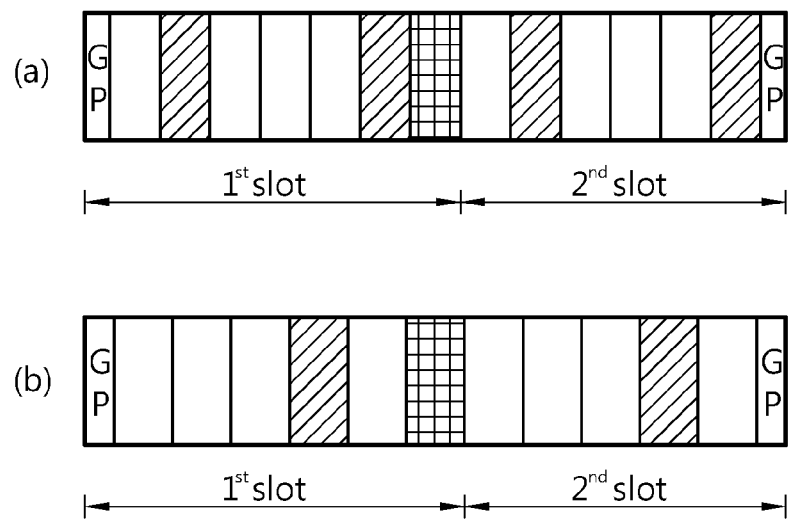

FIG. 22 shows another example of an R-PUCCH structure according to the proposed control signal transmission method of an RS. The R-PUCCH structure of FIG. 22 is for R-PUCCH format-2 transmission. FIG. 22(a) shows a case where a UL backhaul subframe has a normal CP structure. FIG. 22(b) shows a case where a UL backhaul subframe has an extended CP structure. In a 1st slot of FIG. 22(a), a DMRS is mapped to 2nd and 6th SC-FDMA symbols, and an ACK/NACK signal is mapped to 1st, 3rd, and 5th SC-FDMA symbols. An SRS is mapped to a 7th SC-FDMA symbol. In a 2nd slot, the DMRS is mapped to 9th to 13th SC-FDMA symbols, and the ACK/NACK signal is mapped to 8th, 10th, and 12th SC-FDMA symbols. The same R-PUCCH structure is configured in two slots except for a guard time and an SC-FDMA symbol to which the SRS is mapped. Similarly to FIG. 22(a), the same R-PUCCH structure is configured in two slots in FIG. 22(b). In addition, a length-4 Hadamard sequence can be used for the DMRS and the ACK/NACK signal of each slot. Although a case where the SRS is mapped to the last SC-FDMA symbol of the 1st slot is described for example in FIG. 21, the SRS can be mapped to the 1st SC-FDMA symbol of the 1st slot.

The RS can transmit a UL control signal according to an R-PUCCH structure based on all of the aforementioned embodiments by using a multiple Tx antenna scheme. For example, a TxD scheme or a beamforming scheme using precoding can be used to obtain a signal-to-noise ratio (SNR) for one R-PUCCH transmission, and spatial multiplexing can be used to transmit a UL control signal through a different R-PUCCH for each antenna port.

Figure 23:
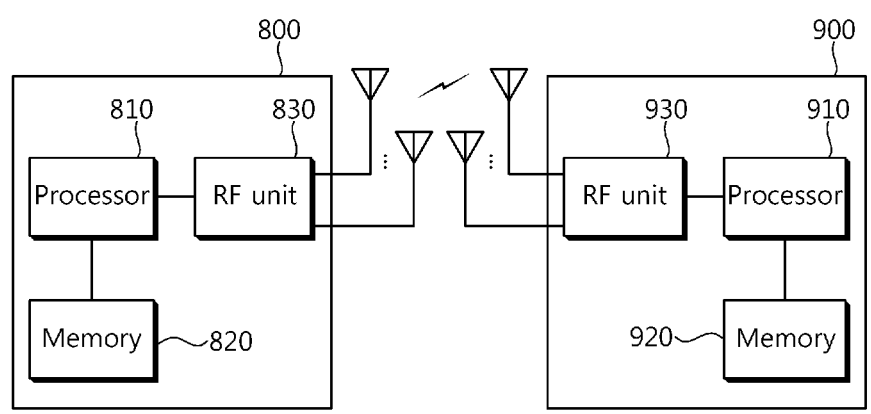
FIG. 23 is a block diagram of a BS and an RS according to an embodiment of the present invention.

FIG. 23 is a block diagram of a BS and an RS according to an embodiment of the present invention.

A BS 800 includes a processor 810, a memory 820, and a radio frequency (RF) unit 830. The processor 810 implements the proposed functions, procedures, and/or methods. The processor 810 assigns an R-PUCCH to an RS. Layers of a radio interface protocol can be implemented by the processor 810. The memory 820 coupled to the processor 810 stores a variety of information for driving the processor 810. The RF unit 830 coupled to the processor 810 transmits and/or receives a radio signal.

An RS 900 includes a processor 910, a memory 920, and an RF unit 930. The processor 910 implements the proposed functions, procedure, and/or methods. The processor 910 is configured to generate a modulation symbol of UL control information, to map the generated modulation symbol to a backhaul subframe to which an R-PUCCH is assigned, and to apply an OC sequence to an SC-FDMA symbol to which the modulation symbol is mapped among SC-FDMA symbols constituting the backhaul subframe. The generated modulation symbol can be mapped to the two slots according to the same pattern. The R-PUCCH structures of FIG. 13 to FIG. 16, FIG. 18 and FIG. 19, and FIG. 21 and FIG. 22 can be configured by the processor 910. Layers of a radio interface protocol can be implemented by the processor 910. The RF unit 930 coupled to the processor 910 transmits and/or receives a radio signal. The memory 920 coupled to the processor 910 stores a variety of information for driving the processor 910.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all alternations, modifications and variations that fall within the spirit and scope of the appended claims.

What is claimed is:

1. A method for transmitting, by a relay station, a control signal for the relay station in a wireless communication system, the method comprising:
    generating a modulation symbol of uplink control information;
    mapping the generated modulation symbol to a backhaul subframe, excluding a guard time in the backhaul subframe, to which a relay physical uplink control channel (R-PUCCH) is assigned,
    wherein the guard time is assigned at a start of the backhaul subframe and at an end of the backhaul subframe, and
    wherein the guard time is used for a mode transition of the relay station from a transmission mode to a reception mode or from the reception mode to the transmission mode;
    applying an orthogonal cover (OC) sequence to a single carrier frequency division multiple access (SC-FDMA) symbol to which the modulation symbol is mapped among SC-FDMA symbols constituting the backhaul subframe; and
    transmitting the backhaul subframe,
    wherein the backhaul subframe includes two slots,
    wherein the generated modulation symbol is mapped to the two slots according to the same pattern, and
    wherein a length of the OC sequence is determined according to a number of SC-FDMA symbols to which the modulation symbol is mapped in one slot.

2. The method of claim 1, wherein the guard time is assigned at first and last SC-FDMA symbols of the backhaul subframe.

3. The method of claim 1, wherein the guard time is assigned at a first half SC-FDMA symbol and a last half SC-FDMA symbol of the backhaul frame.

4. The method of claim 3, wherein a sounding reference signal (SRS) is mapped to the backhaul subframe.

5. The method of claim 4, wherein the SRS is mapped to a last SC-FDMA symbol of a first slot of the backhaul subframe or a last SC-FDMA symbol of a second slot of the backhaul subframe.

6. The method of claim 1, wherein the OC sequence is either a discrete Fourier transform (DFT) sequence or a Hadamard sequence.

7. The method of claim 1, wherein the uplink control information includes at least one of an acknowledgement/non-acknowledgement (ACK/NACK), a channel quality indicator (CQI), and a scheduling request (SR).

8. The method of claim 1, wherein a pattern by which the modulation symbol is mapped to the backhaul subframe is determined according to a type of the uplink control information.

9. The method of claim 1, wherein the R-PUCCH is assigned by a higher layer message transmitted by a base station.

10. An apparatus for transmitting a control signal for a relay station in a wireless communication system, the apparatus comprising:
    a processor; and
    a radio frequency (RF) unit, coupled to the processor, for transmitting a backhaul subframe,
    wherein the processor is configured to:
        generate a modulation symbol of uplink control information;
        map the generated modulation symbol to a backhaul subframe, excluding a guard time in the backhaul subframe, to which a relay physical uplink control channel (R-PUCCH) is assigned,
        wherein the guard time is assigned at a start of the backhaul subframe and at an end of the backhaul subframe, and
        wherein the guard time is used for a mode transition of the relay station from a transmission mode to a reception mode or from the reception mode to the transmission mode; and
        apply an orthogonal cover (OC) sequence to a single carrier frequency division multiple access (SC-FDMA) symbol to which the modulation symbol is mapped among SC-FDMA symbols constituting the backhaul subframe,
    wherein the backhaul subframe includes two slots and the generated modulation symbol is mapped to the two slots according to the two slots, and
    wherein a length of the OC sequence is determined according to a number of SC-FDMA symbols to which the modulation symbol is mapped in one slot.

11. The apparatus of claim 10, wherein the uplink control information includes at least one of an acknowledgement/non-acknowledgement (ACK/NACK), a channel quality indicator (CQI), and a scheduling request (SR).

12. The apparatus of claim 10, wherein a pattern by which the modulation symbol is mapped to the backhaul subframe is determined according to a type of the uplink control information.

13. The apparatus of claim 10, wherein the guard time is assigned at first and last SC-FDMA symbols of the backhaul subframe or a first half SC-FDMA symbol and a last half SC-FDMA symbol of the backhaul frame.

* * * * *